(12) United States Patent
May et al.

(10) Patent No.: US 9,635,347 B2
(45) Date of Patent: Apr. 25, 2017

(54) STEREOSCOPIC RELAY OPTICS

(75) Inventors: Kevin Brent May, Yorba Linda, CA (US); Richard J. Michaels, Irvine, CA (US)

(73) Assignee: Reach3D Medical LLC, Suwanee, GA (US)

( * ) Notice: Subject to any disclaimer, the term of this patent is extended or adjusted under 35 U.S.C. 154(b) by 765 days.

(21) Appl. No.: 13/885,547

(22) PCT Filed: Nov. 15, 2011

(86) PCT No.: PCT/US2011/060826
§ 371 (c)(1),
(2), (4) Date: Aug. 9, 2013

(87) PCT Pub. No.: WO2012/068137
PCT Pub. Date: May 24, 2012

(65) Prior Publication Data
US 2013/0307939 A1    Nov. 21, 2013

Related U.S. Application Data

(60) Provisional application No. 61/413,621, filed on Nov. 15, 2010.

(51) Int. Cl.
*H04N 13/02* (2006.01)
*G03B 17/56* (2006.01)
*G03B 35/02* (2006.01)

(52) U.S. Cl.
CPC ....... *H04N 13/0207* (2013.01); *G03B 17/565* (2013.01); *G03B 35/02* (2013.01); *H04N 13/021* (2013.01)

(58) Field of Classification Search
None
See application file for complete search history.

(56) References Cited

U.S. PATENT DOCUMENTS

| | | |
|---|---|---|
| 2,639,653 A | 5/1953 | Fischer |
| 3,574,295 A | 4/1971 | Tasaki |
| 3,712,199 A | 1/1973 | Songer |
| 3,820,882 A | 6/1974 | Jakubowski |
| 4,143,938 A | 3/1979 | Feinbloom et al. |
| 4,272,161 A | 6/1981 | Feinbloom et al. |
| 4,300,167 A | 11/1981 | Miller et al. |
| 4,344,667 A | 8/1982 | Wooff, Jr. |
| 4,418,993 A | 12/1983 | Lipton et al. |
| 4,688,907 A | 8/1987 | Kleinberg et al. |
| 4,716,066 A | 12/1987 | Fattinger et al. |

(Continued)

FOREIGN PATENT DOCUMENTS

| | | |
|---|---|---|
| CN | 1910495 A | 2/2007 |
| GB | 606065 A | 8/1948 |

(Continued)

*Primary Examiner* — Kate Luo
(74) *Attorney, Agent, or Firm* — KPPB LLP

(57) ABSTRACT

A relay optic adapter system for imaging stereoscopic images with a single lens optic device and methods of producing stereoscopic images using such a relay optic adapter are provided herein. The relay optic adapter system utilizes an active stereoscopic shutter mounted along the optical path of the single lens optic device, such as, for example, a still or video camera, to provide a stereoscopic image to imaging plane of the device.

32 Claims, 9 Drawing Sheets

(56) References Cited

U.S. PATENT DOCUMENTS

| | | |
|---|---|---|
| 4,768,049 A | 8/1988 | Barrett et al. |
| 4,781,448 A | 11/1988 | Chatenever et al. |
| 4,805,027 A | 2/1989 | Sluyter et al. |
| 5,063,441 A | 11/1991 | Lipton et al. |
| 5,222,477 A | 6/1993 | Lia et al. |
| 5,264,928 A | 11/1993 | Howes et al. |
| 5,471,237 A | 11/1995 | Shipp |
| 5,617,007 A | 4/1997 | Keidl et al. |
| 5,828,487 A | 10/1998 | Mitchell et al. |
| 5,835,264 A | 11/1998 | Tandler et al. |
| 5,867,312 A | 2/1999 | Greenberg |
| 5,914,810 A * | 6/1999 | Watts ............... G02B 27/2264 348/45 |
| 5,964,696 A | 10/1999 | Mihalca et al. |
| 6,275,335 B1 | 8/2001 | Costales |
| 6,624,935 B2 | 9/2003 | Weissman et al. |
| 6,781,630 B2 | 8/2004 | Nomura et al. |
| 6,807,295 B1 * | 10/2004 | Ono ............... G02B 23/2415 348/42 |
| 7,112,774 B2 | 9/2006 | Baer et al. |
| 7,170,547 B2 | 1/2007 | Uchiyama et al. |
| 7,621,868 B2 | 11/2009 | Breidenthal et al. |
| 2001/0012053 A1 | 8/2001 | Nakamura |
| 2002/0080481 A1 | 6/2002 | Tachihara et al. |
| 2002/0141057 A1 | 10/2002 | Weissman et al. |
| 2005/0077450 A1 | 4/2005 | Baer et al. |
| 2005/0093891 A1 | 5/2005 | Cooper |
| 2007/0030446 A1 | 2/2007 | Su et al. |
| 2008/0239064 A1 | 10/2008 | Iwasaki |
| 2008/0303896 A1 * | 12/2008 | Lipton ............... H04N 13/0048 348/49 |
| 2010/0020160 A1 | 1/2010 | Ashbey |
| 2010/0154077 A1 * | 6/2010 | Emmanuel ........... C07K 14/415 800/281 |
| 2010/0208046 A1 * | 8/2010 | Takahashi ........... A61B 1/00193 348/65 |
| 2010/0231686 A1 | 9/2010 | Goto et al. |
| 2011/0298892 A1 * | 12/2011 | Baer ................. H04N 13/0239 348/46 |
| 2013/0258462 A1 | 10/2013 | May et al. |

FOREIGN PATENT DOCUMENTS

| | | |
|---|---|---|
| GB | 2168565 A | 6/1986 |
| GB | 2268283 A | 1/1994 |
| GB | 2250604 B | 5/1994 |
| JP | 09505906 A | 6/1997 |
| JP | 09215012 A | 8/1997 |
| JP | 1043126 A | 2/1998 |
| JP | 11237702 A | 8/1999 |
| JP | 2001012915 A | 1/2001 |
| JP | 2001502817 A | 2/2001 |
| JP | 2004503278 A | 2/2004 |
| JP | 2004524553 A | 8/2004 |
| JP | 2013545132 A | 12/2013 |
| WO | 9615631 A1 | 5/1996 |
| WO | 9637796 A1 | 11/1996 |
| WO | 0195791 A1 | 12/2001 |
| WO | 2012054481 A1 | 4/2012 |
| WO | 2012068137 A1 | 5/2012 |

* cited by examiner

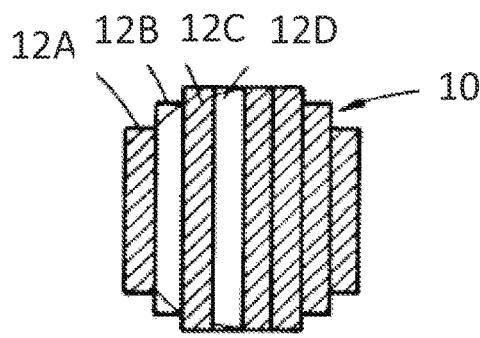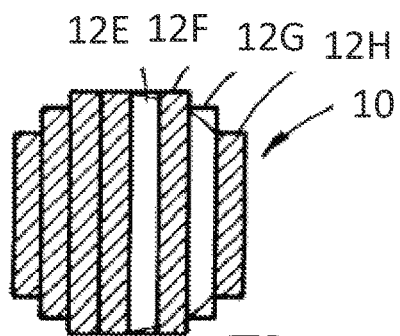
Fig. 2A  Fig. 2B
PRIOR ART
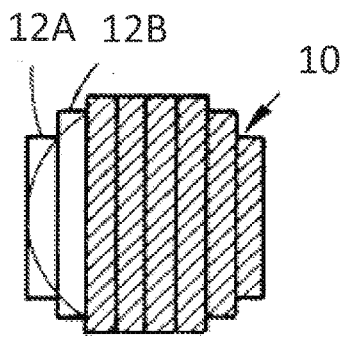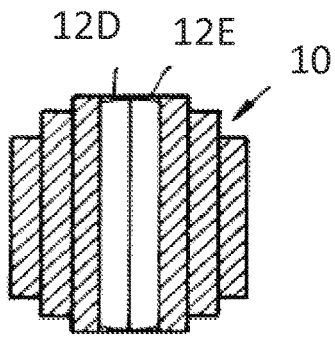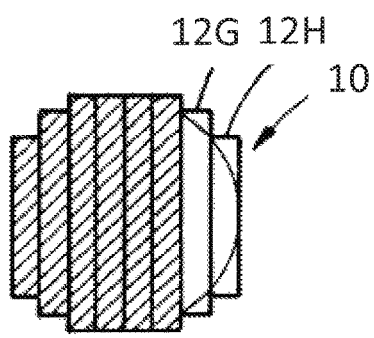
Fig. 3A  Fig. 3B  Fig. 3C
PRIOR ART

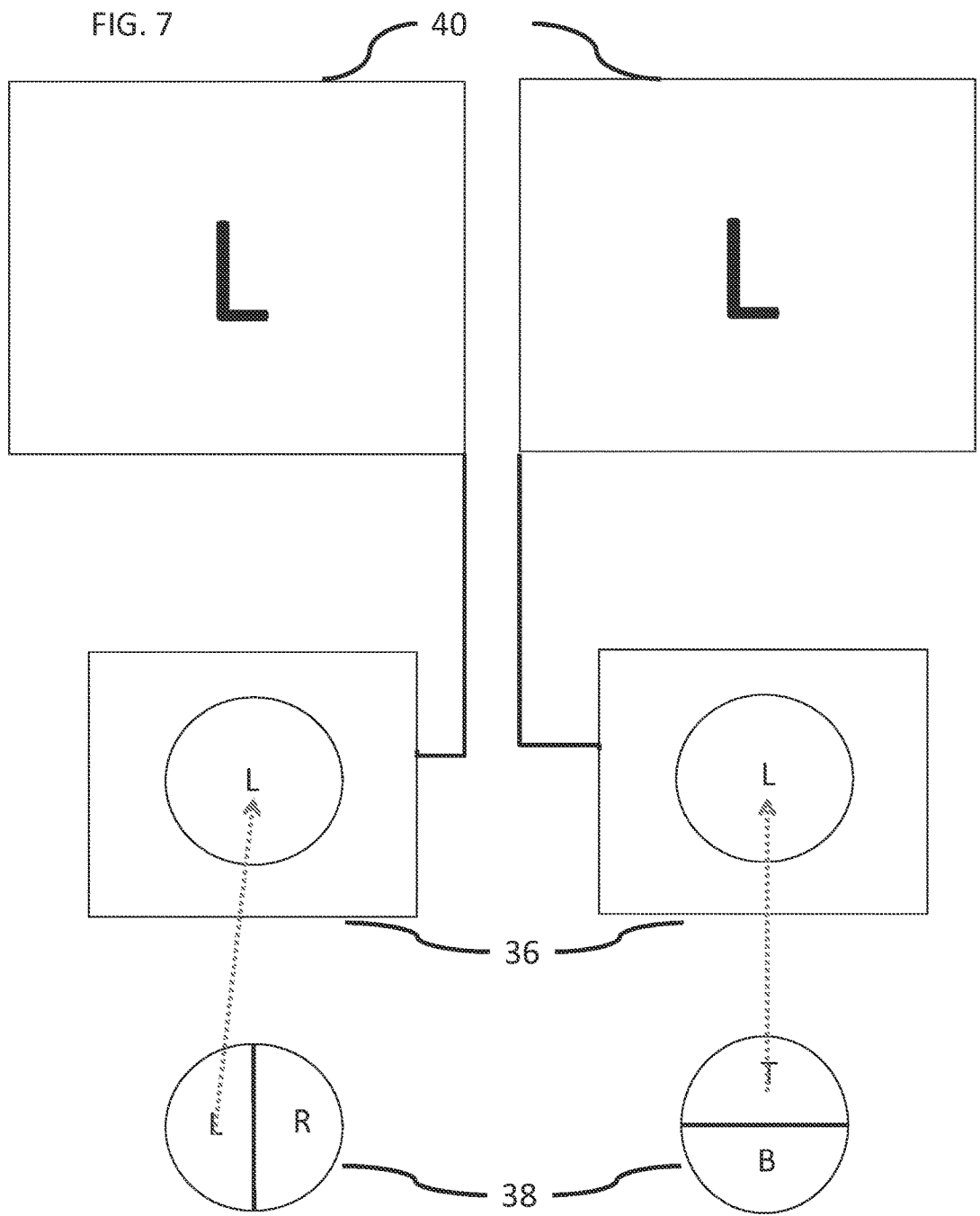

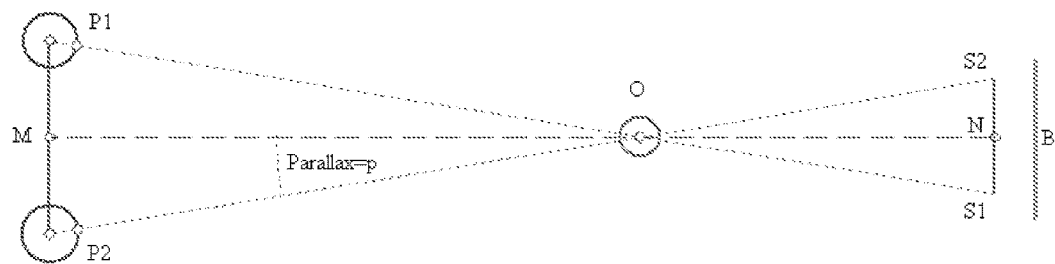
FIG. 8
FIG. 9A
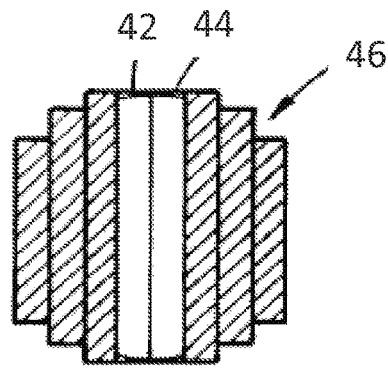
FIG. 9B
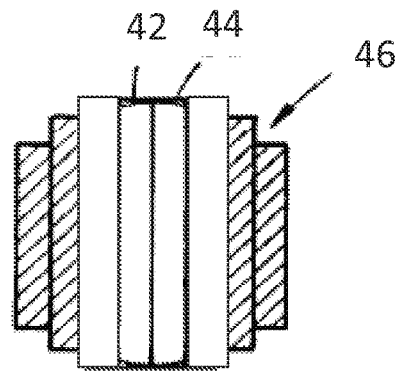
FIG. 9C
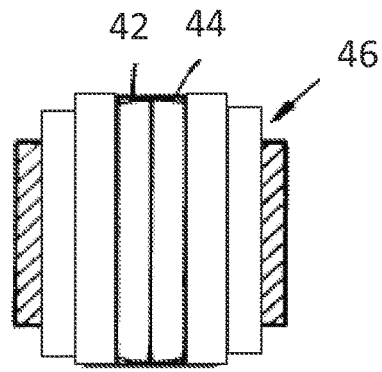

STEREOSCOPIC RELAY OPTICS

FIELD OF THE INVENTION

The present invention relates generally to stereoscopic optical equipment, and more specifically to stereoscopic relay optic assemblies suitable for mounting to conventional single lens optics, such as cameras and camcorders to provide stereoscopic image capture capabilities.

BACKGROUND OF THE INVENTION

Attempts to reproduce the stereoscopic effect produced by human "binocular vision" with cameras dates back to the 19$^{th}$ century. These early attempts were based on the simple premise that if one camera could mimic one eye and produce a 2D photograph, then two cameras, set up at a similar distance apart as the human eyes, could mimic the 3D stereopsis effect as well. In such a system, each photograph mimics the image taken from each eye with the corresponding parallax and shifts as necessary to judge distance by stereopsis alone. The two photographs thus obtained would need to be displayed to an observer with one photograph to one eye and the other to the other.

The first device capable of reproducing stereoscopic images was known as a stereoscope. It was a popular device even as early as the 1850's, and it was not long after the invention of moving pictures that moving 3D films were shown.

Since that time, many methods of display have been developed that go beyond the stereoscope including, anaglyph (red/green glasses) and LCD switchable glasses, autostereoscopic methods (where no glasses at all are required), head tracking displays and virtual reality. However, any display can be only as good as the photographs or images that are presented to it.

As a result, many designs for cameras have also been made. The three most common are a single camera moved on a slide, a single camera with extra mirrors and optics, and a two-camera design. Examples of these systems include, GB 2250604, which describes an adapter that can be attached to any camera to produce a stereoscopic effect via a complex series of mirrors and a zoom lens; WO 96/15631, which describes a method where two homologous images are superimposed as anaglyph with an offset in the x and y directions; GB 2 168 565 and JP 9-215012, which each describe two-camera systems; U.S. Pat. No. 4,768,049, which refers to a method of positioning a single camera in two positions accurately using a slide bar; U.S. Pat. No. 5,063,441, which discloses a stereoscopic video camera with parallel optical axes and a single camera image sensor; and U.S. Pat. No. 4,418,993, which discloses an arrangement for controlling convergence and separation so as to maintain an object at the image centre when zoom is affected. (The disclosures of each of these are incorporated herein by reference.)

Despite the wide-variety of "solutions" to the problem of capturing stereoscopic images, most of these systems require the use of specialized cameras or complex attachments that fundamentally alter the operation of the camera. In addition, many of these systems are expensive and not easily controlled by an unskilled user.

In contrast to these conventional stereoscopic cameras, modern 2D cameras have become increasingly simple to use and offer increasingly more and more powerful options to the user. For example, one of the major advantages of conventional 2D cameras, most notably single-lens reflex (SLR) or digital single-lens reflex (DSLR) cameras, is that they allow for the possibility of changing lenses, to select the best lens for the current photographic need, and to allow the attachment of specialized lenses. In particular, film SLR cameras have existed since the late 1950s, and over the years a very large number of different lenses have been produced, both by camera manufacturers (who typically only make lenses intended for their own camera bodies) and by third-party optics companies who may make lenses for several different camera lines. In addition, DSLRs became available around the mid-1990s, and have become extremely popular in recent years, and some manufacturers, for example Minolta, Canon and Nikon, have engineered their DSLRs to be 100% compatible with their existing SLR lenses.

Accordingly, it would be advantageous to develop an optic adapter capable of allowing for the capture of stereoscopic images from single lens standard optical devices such as cameras and video cameras using a device that allows for the use of the entire functionality of the underlying camera including variable magnifications.

SUMMARY OF THE INVENTION

The present invention is directed to an optical adapter that may be interconnected with conventional single-lens video and/or still cameras to provide stereoscopic images, without interfering with the underlying functionality of the camera.

In one embodiment, the relay optics adapter for a camera comprises a shutter element that is incorporated into a single-lens camera or video camera like device at/or near the pupil plane of the camera to produce stereoscopic images therefrom. In such an embodiment, the relay optic adapter may be built-into the camera or camera lens, or may include a detachable adapter that can be interconnected therebetween.

In still another embodiment, the stereoscopic shutter includes means arranged to selectively occlude light exiting from left and right regions of said further lens means to form right and left images on said image plane and having means for combining said right and left images to form a stereoscopic representation of the field of view of said objective. In such an embodiment, the means for combining the right and left images may for example comprise a video processing circuit, which generates a video signal representing the alternating left and right images. Such a video signal can be regarded as a stereoscopic representation in electronic form.

In yet another embodiment, the shutter means comprises an array of more than two optical shutter elements distributed from left to right and means for controlling the light transmission of said optical shutter elements so as to vary the stereo base width between said right and left images. These elements may take any shape suitable for producing a change in position between the left and right images.

In still yet another embodiment, the shutter means includes control means for varying the size of the unoccluded left and right regions of said further lens means to vary the width of field and/or the illumination at said image plane. Preferably said shutter means comprises a multisensitivity of shutter elements arranged to form vertical units of controllable width and/or height and separation. In one such embodiment, the width of the field is integrated with a distance detector so that the parallax of the image can be optimized.

In still yet another embodiment, the shutter and camera are positioned relative to one another to optimize the stereoscopic imaging, such that the camera and shutter always maintain the proper alignment.

In still yet another embodiment, the shutter is electronically controlled such that the shutter elements may be controlled manually. In one such embodiment, the shutter may be turned off to allow for 2D viewing without modifying the device. In another such embodiment, the shutter and camera are controlled to allow for the triggering of stereoscopic still images.

In still yet another embodiment, the invention is directed to methods of imaging or recording stereoscopic images using a stereoscopic relay optic adapter.

In some embodiments, the invention is directed to a stereoscopic optic adapter including:
  an optical relay interconnectable between an image capture device and an optical lens of said image capture device, the optical relay including at least a stereoscopic shutter and at least one optical element;
  wherein the stereoscopic shutter is configured to produce a stereoscopic image from an original image captured by the optical lens of the image capture device;
  wherein the at least one optical element of the optical relay is configured to transmit the original image from said optical lens through said stereoscopic shutter to said image capture device without altering the lens characteristics of said optical lens, such that a stereoscopic image having the same optical characteristics of the original image is transmitted to the image capture device from the optical relay; and
  wherein the relative rotational alignment between the stereoscopic shutter and the image capture device is adjustable such that a stereoscopic image may be produced regardless of the orientation of the image capture device.

In one such embodiment, the stereoscopic shutter is configured to alternately occlude the light exiting from predetermined regions of the single lens optical device. In another such embodiment, the predetermined regions are the left and right regions of the imaged region. In still another such embodiment, the shutter includes a plurality of separately controllable occludable regions. In yet another such embodiment, the occludable regions are formed by a device selected from the group consisting of mechanical, electromechanical, chemical and material. In still yet another embodiment, the occludable regions are formed in a shape selected from the group consisting of curve, circular, hexagonal and rectangular. In still yet another embodiment, at least one of the occludable regions is fixed.

In another such embodiment the at least one optical element of the relay optic comprises a pair of paraxial lenses, and wherein the stereoscopic shutter is disposed at the real image of the aperture stop of said paraxial lenses.

In still another such embodiment, the optic adapter comprises a separate body removably interconnectable between the optical lens and the image capture device. In one such embodiment, the interconnection is a mounting system selected from the group consisting of M42, M39, Canon EF and EF-S lens mounts, Four Thirds system, Micro Four Thirds system, Pentax K mount, Sigma SA mount, Sony α mount system, and generic bayonet style mounts.

In yet another such embodiment, the camera lens is a multi-element camera lens and wherein the optic adapter is disposed within the multi-element camera lens of the image capture device.

In still yet another such embodiment, the optic adapter is disposed within the body of the image capture device.

In still yet another such embodiment, the stereoscopic shutter acts as an iris.

In still yet another such embodiment, the camera lens is a zoom lens and wherein the optic adapter is incorporated within the zoom lens. In one such embodiment, the zoom lens comprises a series of converging lenses that are configured to be removably placed into optical alignment with the stereoscopic shutter to adjust the focal length of the adapter.

In still yet another such embodiment, the lens characteristics transmitted through the optic adapter include at least one selected from the group consisting of focal length, aperture, field of view, auto zoom and focusing.

In still yet another such embodiment, the optical lens and the image capture device further include at least one cooperative electrical interconnect, and the adapter further comprises at least one electrical connection cooperative with the at least one electrical interconnection on the optical lens and the image capture device such that a signal path is established between the optical lens and the image capture device through the adapter.

In still yet another such embodiment, the image capture device is selected from the group consisting of mechanical still cameras, digital still cameras, CCDs, CMOSs, digital video camera, and light field capture systems.

In still yet another such embodiment, at least one of the adapter and image capture device are mounted on adjustment stages configured to allow the rotational alignment of the adapter in relation to the image capture device.

In still yet another such embodiment, both the adapter and image capture device are mounted on rotational adjustment stages configured to allow the rotational alignment of the stereoscopic shutter in relation to the image capture device, and wherein the adjustment stages are interconnected such that rotation of one of either the stereoscopic shutter or the image capture device causes an equivalent rotation in its counterpart.

In still yet another such embodiment, the image capture device automatically rotates its perspective based on the orientation of the image capture device with respect to the horizon.

In still yet another such embodiment, the adapter is configured to automatically rotate based on the orientation of the image capture device.

In still yet another such embodiment, further includes a programmable controller circuit to control the operation of the stereoscopic shutter. In one such embodiment, the shutter comprises a plurality of separately controllable occludable regions configured to alternately occlude the light exiting from predetermined regions of the single lens optical device, and wherein the programmable controller circuit controls the operation of each of the occludable regions. In another such embodiment, the programmable controller circuit is in further signal communication with the image capture device, and is configured to synchronize the image capture device with the opening and closing of the stereoscopic shutter to ensure stereoscopic viewing. In still another such embodiment, the programmable controller circuit is configured to disable the stereoscopic shutter such that the adapter can be reconfigured into a non-stereoscopic device. In yet another such embodiment, the programmable controller circuit is configured to examine parallax of the stereoscopic image, and to optimize the operation of the stereoscopic shutter for optimum stereoscopic imaging. In still yet another such embodiment, the image capture device has a rolling shutter, and wherein the programmable controller circuit is configured to synchronize the stereoscopic shutter with said rolling shutter. In still yet another such embodiment, the image capture device includes a still camera, and wherein the programmable controller circuit is configured to synchronize the still camera with the stereoscopic lens to capture a single still stereoscopic image. In still yet another such embodiment, the programmable controller circuit is configured to allow for the conversion of data from the image capture device to a stereoscopic video output in a format selected from the group consisting of frame sequential, progressive, interlaced, side by side, checkerboard and horizontal interleave/line by line. In still yet another such embodiment, the programmable controller circuit is configured to center the stereoscopic shutter position with the optical axis of the single lens optic device.

In still yet another embodiment, the stereoscopic shutter is electronic and the stereoscopic effect is generated via image signal processing.

BRIEF DESCRIPTION OF THE DRAWINGS

These and other features and advantages of the present invention will be better understood by reference to the following detailed description when considered in conjunction with the accompanying drawings, wherein:

FIGS. 2A and 2B are schematics of a stereoscopic shutter in accordance with the prior art;

FIGS. 3A to 3C are schematics of another embodiment of a stereoscopic shutter in accordance with the prior art;

FIG. 7 is a schematic of the synchronization between the camera and stereoscopic shutter in accordance with the current invention;

FIG. 8 is a schematic of the parallax phenomenon; and

FIGS. 9A to 9C are schematics of another embodiment of a stereoscopic shutter in accordance with the current invention.

DETAILED DESCRIPTION OF THE INVENTION

The current invention is directed to a stereoscopic adapter for attachment to conventional single-lens video and/or still cameras to provide stereoscopic image capture capabilities, while still allowing for the use of any underlying functionality of the camera. In particular, the current invention provides a stereoscopic optical element that may be built into or detachably attached onto any single-lens video and/or still camera that incorporates the stereoscopic image capture technology of the Watts patent (U.S. Pat. No. 5,914,810) into conventional single-lens cameras without impacting any underlying functionality of the camera or optical attachments to the camera. Although the current invention may be applied to any number of cameras, the following discussion will focus on implementation of the invention onto a single-lens reflex camera.

Overview of Conventional SLR and DSLR Cameras

Figure 1:
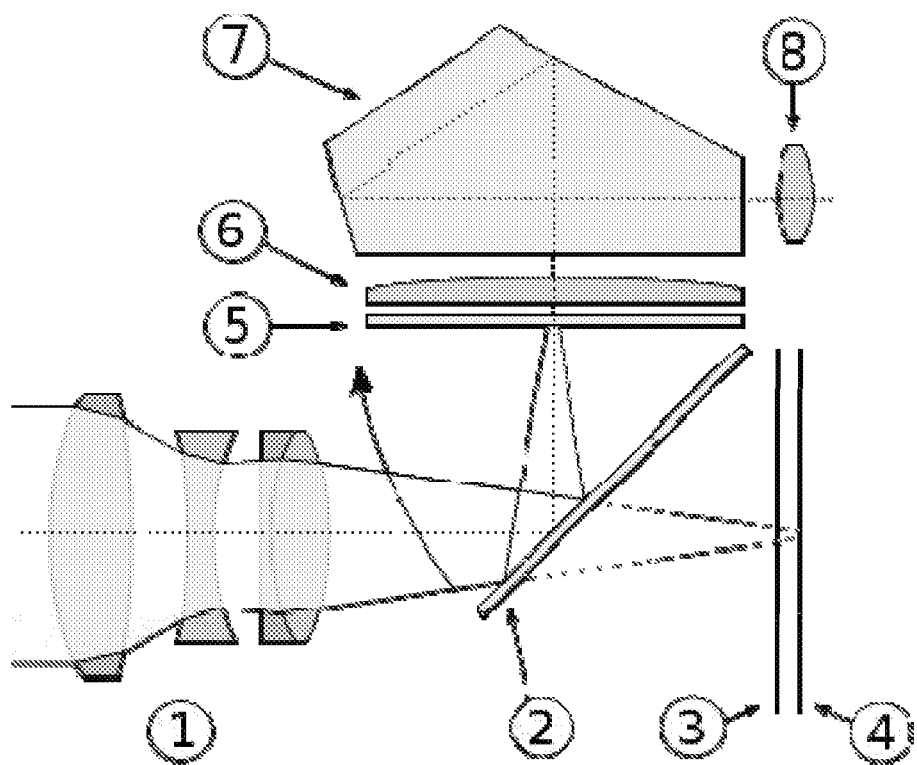
FIG. 1 is an exploded view of a conventional camera optic arrangement in accordance with the prior art.

A single-lens reflex (SLR) camera is a camera that typically uses a semi-automatic moving mirror system that permits the photographer to see exactly what will be captured by the film or digital imaging system (after a very small delay), as opposed to pre-SLR cameras where the view through the viewfinder could be significantly different from what was captured on film. (An optical schematic of a standard SLR is provided in FIG. 1.) Prior to the development of SLR, all cameras with viewfinders had two optical light paths: one path through the lens to the film, and another path positioned above (TLR or twin-lens reflex) or to the side (rangefinder). Because the viewfinder and the film lens cannot share the same optical path, the viewing lens is aimed to intersect with the film lens at a fixed point somewhere in front of the camera. This is not problematic for pictures taken at a middle or longer distance, but parallax causes framing errors in close-up shots. Moreover, focusing the lens of a fast reflex camera when it is opened to wider apertures (such as in low light or while using low-speed film) is not easy.

The basic optics of an SLR camera include a Front-mount lens (e.g., such as the 4-element Tessar design shown) (1), a reflex mirror at 45-degree angle (2), a focal plane shutter (3), a sensor or film repository (4), a focusing screen (5), a condenser lens (6), an optical glass pentaprism (or pentamirror) (7), and an eyepiece (can have diopter correction ability) (8). Most SLR cameras permit upright and laterally correct viewing through use of the pentaprism situated in the optical path between the reflex mirror and viewfinder. Light is reflected by a movable mirror upwards into the pentaprism where it is reflected several times until it aligns with the viewfinder. When the shutter is released, the mirror moves out of the light path, and the light shines directly onto the film (or in the case of a DSLR, the CCD or CMOS imaging sensor). In such a system, focus can be adjusted manually by the photographer or automatically by an autofocus system. The viewfinder can include a matte focusing screen located just above the mirror system to diffuse the light. This permits accurate viewing, composing and focusing, especially useful with interchangeable lenses.

The ability to interchange lenses in a camera is attractive because it means a user is able to select the best lens for the current photographic need, and to allow the attachment of specialized lenses. Modern cameras such have detachable lenses. There are several characteristics of all lenses that determine their optical qualities:

Lens Aperture: The aperture of a lens is the opening that regulates the amount of light that passes through the lens. It is controlled by a diaphragm inside the lens, which is in turn controlled either manually or by the exposure circuitry in the camera body. The relative aperture is specified as an f-number, the ratio of the lens focal length to its effective aperture diameter. A small f-number like f/2.0 indicates a large aperture (more light passes through), while a large f-number like f/22 indicates a small aperture (little light passes through). Aperture settings are usually not continuously variable; instead the diaphragm has typically 5-10 discrete settings. The normal "full-stop" f-number scale for modern lenses is as follows: 1, 1.4, 2, 2.8, 4, 5.6, 8, 11, 16, 22, 32, but many lenses also allow setting to half-stop or third stop increments. A "slow" lens (one that is not capable of passing a lot of light through) might have a maximum aperture from 5.6 to 11, while a "fast" lens (one that can pass more light through) might have a maximum aperture from 1 to 4. Fast lenses are typically larger than slow lenses (for comparable focal length). The aperture affects not only the amount of light that passes through the lens, but also the depth of field of the resulting image: a larger aperture will have a shallow depth of field, while a smaller aperture will have a wider depth of field.

Focal Length & Angle of View: The focal length of a lens, together with the size of the image sensor in the camera, determines the angle of view. A lens is considered to be a "normal lens", in terms of its angle of view on a camera, when its focal length is approximately equal to the diagonal dimension of the film or image sensor format. The resulting diagonal angle of view of about 53 degrees is often said to approximate the angle of human vision, since the angle of view of a human eye is at least 140 degrees. A wide-angle lens has a shorter focal length, and includes more of the viewed scene than a normal lens; while a telephoto lens has a longer focal length, and images a small portion of the scene, making it seem closer.

With these characteristics in mind, some examples of lenses commonly used with cameras include:

Zoom Lenses: which is a lens in which the focal length is not fixed; instead it can be varied between a specified minimum and maximum value. Zoom lenses still typically have a lower maximum aperture than fixed-focal ("prime") lenses for the same weight and cost, especially for shorter focal lengths. Zoom lenses are often described by the ratio of their longest to shortest focal lengths. For example, a zoom lens with focal lengths ranging from 100 mm to 400 mm may be described as a 4:1 or "4×" zoom. Typical zoom lenses cover a 3.5× range, for example from 24-90 mm (standard zoom) or 60-200 mm (telephoto zoom). Super-zoom lenses with a range of 10× or even 14×, however, are available.

Prime Lenses: which are standard non-zoom lenses or simply "primes". Their advantage, in addition to typically giving a slightly better image quality, is that they are smaller, lighter and cheaper than a zoom lens of the same quality. A prime lens may also be "faster", i.e., have a larger maximum aperture (smaller f-number), so it can be used with less light (with the same shutter speed), and can provide less depth of field in situations where this is desirable.

Macro Lenses: which are designed for extreme close-up work. Such lenses are popular for nature shooting such as small flowers, as well as for many technical applications. As most of these lenses can also focus to infinity and tend to be quite sharp, many are used as general-purpose optics.

Special Purpose Lenses: which are designed to provide very specific visual effects, such as, for example:

Fisheye Lenses: which are extreme wide-angle lenses with an angle of view of up to 180 degrees or more, with very noticeable (and intended) distortion;

Apochromat Lenses: which are lenses that have added correction for chromatic aberration;

Process Lenses: which are lenses that have extreme correction for aberrations of geometry (pincushion distortion, barrel distortion) and are generally intended for use at a specific distance;

Enlarger lenses: which are made to be used with photographic enlargers (specialized projectors);

Aerial Photography Lenses: which are designed for use on aerial shots;

Soft-focus Lenses: which give a soft, but not out-of-focus, image and have an imperfection-removing effect popular among portrait and fashion photographers;

Infrared & Ultraviolet Lenses: which are designed to filter out non-desired wavelengths of light;

Swivel Lenses: which rotate while attached to a camera body to give unique perspectives and camera angles; and Shift & Tilt/shift Lenses: which are collectively known as perspective control lenses and allow special control perspective.

Regardless of the lens chosen, it is critical that the underlying functionality of the lens and the ability of the camera to accept and interchange between lenses be maintained. Any stereoscopic adapter that degrades or limits this functionality will inherently limit the usefulness of the camera.

Overview of the Watts Stereoscopic Technology

Although the above discussion focused on the structure and function of conventional single lens optical devices, including SLR and DSLR cameras and video cameras, the current invention is directed to a stereoscopic optical adapter that modifies the structures of the prior art cameras to incorporate the stereoscopic imaging technique of Watts, set forth in U.S. Pat. No. 5,914,810, disclosed above. Before the novel relay optic can be described in detail, an explanation of the Watts stereoscopic imaging method is required.

The core of the Watts method is the provision of a novel stereoscopic shutter 10, shown schematically in FIGS. 2A to 2B and 3A to 3C. The shutter is arranged to alternately occlude the light exiting from the left and right regions of an ocular preferably at a rapid rate (such as 60 to 120 times per second for video, although it should be understood that any suitable rate can be used where the higher the rate will provide superior properties), under the control of a signal from a dedicated video processing circuitry. The shutter is composed of separately controllable regions, which are formed by a mechanical, electromechanical, chemical or material means capable of rapid switching, such as, for example, a liquid crystal material. In the embodiment, shown in FIGS. 2 and 3, these regions are composed of vertical strips 12a to 12h, which can be individually controlled by signals from the control circuitry. For example, in FIG. 2A, when the left-hand image is formed elements 12a and 12b would open. At the instant the shutter switching signal is generated, these shutter elements are closed and shutter elements 12e and 12g are then opened as shown in FIG. 2b, allowing the right-hand image to be formed.

The above sequence is repeated at a rapid rate, such as, for example, at 60 to 120 image pairs per second. Although vertical strip are used as an example above it should be understood that he shutter may be divided into cells of any shape, size or dimension, provided the cells are capable of selectively occluding different vertical regions of the shutter. For example, rather than being straight the individual elements of the stereoscopic shutter maybe curved, circular, hexagonal, etc. In addition, although all of the individual elements of the shutters described above are formed from similar electromechanical or mechanical elements, it should be understood that the shutter might be made of a mix of these elements. For example, in one embodiment, the middle shutter element might be fixed or mechanical, while the side elements would be electrically controllable elements, such as, LCD elements.

By controlling the number of shutter elements open at each exposure, the illumination and/or depth of field can be controlled and the conventional shutter 3 (FIG. 1) can be dispensed with. For example, if only shutter element 12c were opened to form the left-hand image and only shutter element 12f were opened to form the right-hand image the f-number of the aperture would be increased relative to that shown in FIG. 2 and hence the illumination would be reduced and the depth of field increased.

The stereoscopic separation between the left-hand and right-hand images can also be varied by adjusting the separation between the shutter elements) opened to form the left-hand image, and the shutter elements) opened to form the right-hand image. For example, the separation could be increased by opening elements 12a and 12b to form the left-hand image, and elements 12g and 12h to form the right-hand image. In this manner the exposure and stereoscopic separation can be varied independently. It is also possible to divide the shutter elements in the vertical direction and thereby enable further control of the aperture size and location to be obtained.

During operation, video-processing circuitry generates a video signal representing the alternating left and right images originating from the left and right portions of the field of view of and outputs any standard video signal, such as, for example, frame sequential, progressive, interlaced, side by side, checkerboard and horizontal interleave/line by line and HDMI encoded video signal. This video signal may be recorded or transmitted to a stereoscopic monitor or other stereoscopic viewing device, which displays the left and right images alternately. Although there are many different types of stereoscopic displays, in one embodiment, the user can then view the image on the screen using spectacles designed for use with the viewing device of choice.

FIG. 3 shows another mode of operation of the above stereoscopic shutter element 10. In this embodiment, the video circuitry would be programmed to generate a three-state switching signal, which would successively cause shutter elements 12a and 12b to open to form the left-hand image (FIG. 3a), shutter elements 12d and 12e to open to form a central image (FIG. 3b), and shutter elements 12g and 12h to form a right-hand image (FIG. 3c). Although this mode of operation slightly compromises the stereoscopic effect, it increases the average illumination and reduces flicker thereby improving overall image quality in some cases. It should be understood that regardless of the operation of the stereoscopic shutter, the device can output a video signal in any suitable standard stereoscopic format.

Finally, although the above examples have shown stereoscopic shutters with three or more shutters, it should be understood that the same effect may be produced using a two-element 50/50 shutter such as that disclosed in U.S. Pat. No. 5,471,237, the disclosure of which is incorporated herein by reference.

Stereoscopic Relay Optics

The current invention provides a system for incorporating a stereoscopic shutter such as that described above, with a conventional video/still camera adapter for any conventional single lens camera, such as, for example a SLR/DSLR still camera, a video camera, a CMOS device, a CCD device or a light-field imaging type device.

Figure 4:
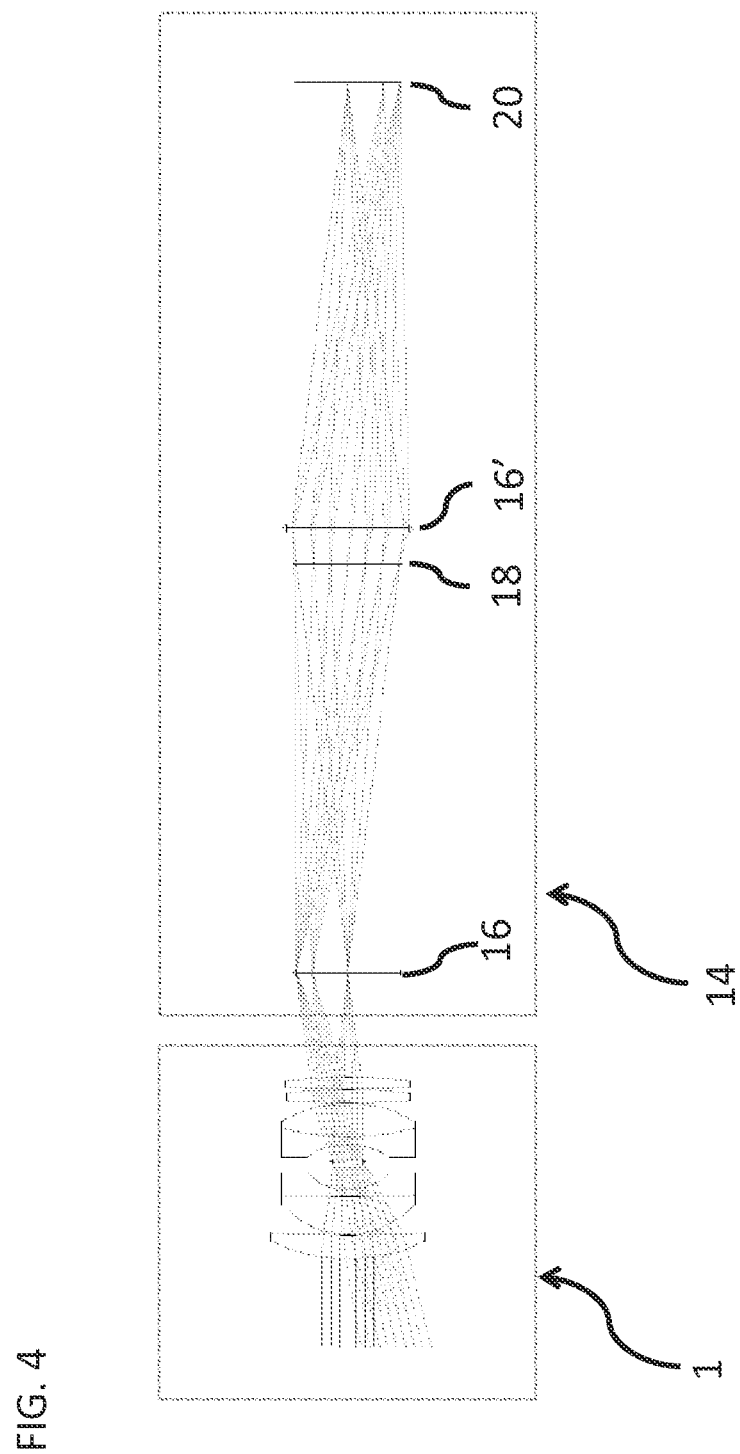
FIG. 4 is a schematic of an embodiment of a stereoscopic relay optic adapter system in accordance with the current invention.

A schematic of the stereoscopic relay optic in accordance of the current invention is shown in FIG. 4. The inventive stereoscopic relay optic 14 is shown in alignment with a typical camera lens 1 (f=23 mm, f/4). As shown the stereoscopic relay system 14 is composed of a pair of paraxial lenses 16 & 16'. The stereoscopic shutter 18 is placed at the real image of the aperture stop, which is located just before the second paraxial lens 16'. As shown, this configuration allows the pupil plane to be reimaged form the existing camera lens 1 through the stereoscopic shutter 18 to the back focal plane 20 of the relay optic without distortion.

Figure 5A:
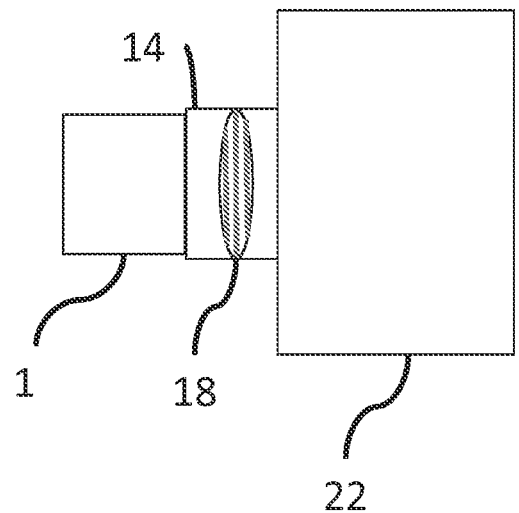
FIGS. 5A to 5D are schematics of a series of embodiments of stereoscopic camera relay optic adapter systems in position in relation to a camera and an conventional camera lens in accordance with the current invention.
Figure 5B:
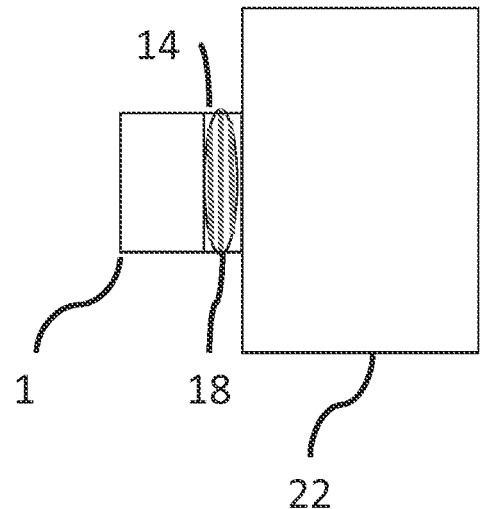
Figure 5C:
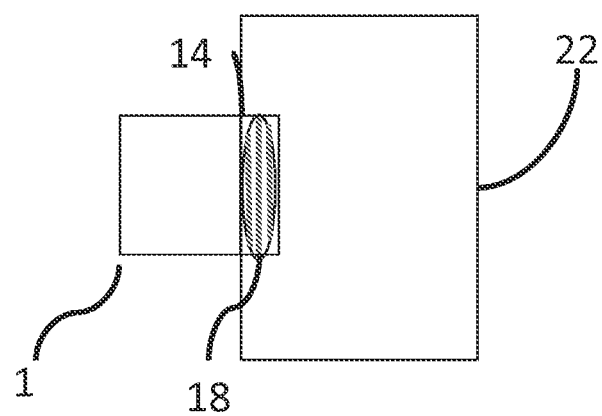

In turn, such a relay optic allows for the shutter to be incorporated into existing lens designs in a number of different configurations, as will be described in greater detail below, and allows for the use of the existing iris and shutter with minimal design changes. Schematics of several alternative configurations of the inventive relay optic configured for use in a camera (FIGS. 5A to 5C) are discussed below. For example, the relay optic may be positioned within a separate relay optic attachment 14 that would be interconnected between the camera body 22 and the camera lens 1 (FIG. 5A), or built within the lens elements of a multi-element camera lens 1 (FIG. 5B). Alternatively, the shutter 14/18 may be placed within the camera/video body 22 itself (FIG. 5C).

Figure 5D:
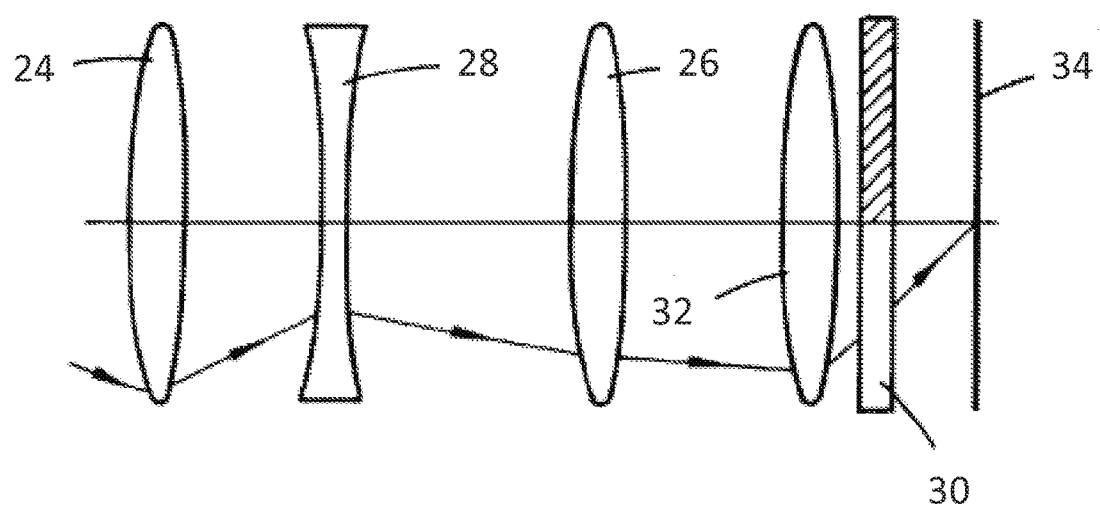

It should be understood that these are only some exemplary configurations; the number of lenses in the lens adapter may be changed to suit the specific arrangement of optical devices. For example, the stereoscopic shutter might be incorporated with a zoom lens. In such an embodiment, as shown schematically in FIG. 5D, a converging lens 24 would be linked by a standard mechanical/electromechanical linkage (not shown) to a further converging lens 26 to enable the focal length to be adjusted. An intermediate diverging lens 28 is provided and the shutter 30 which may be as shown and described above with reference to any of FIGS. 6 and 7, for example is mounted behind a further converging lens 32, where the iris would normally be located. The image is then focused as normal on a video/still camera 34. In a preferred embodiment, the shutter assembly is disposed between the lenses for optimal placement.

In addition, non-essential aspects of the device may be omitted. For example, as described above the stereoscopic shutter can operate as an iris thereby removing the need for a second iris.

Regardless of the position of the stereoscopic shutter or the specific optics incorporated into the stereoscopic relay optic and camera, it is important that the optics of the relay optic and the camera mount be aligned and chosen to ensure that the optic properties of the camera lens pass through the stereoscopic relay unaltered (apart from the addition of the stereoscopic affect) and that the stereoscopic image reach the video/still camera without distortion and in the proper configuration. In the case where the stereoscopic optic relay is built into either the camera or the lens itself, as shown in FIGS. 5B & 5C, this can be engineered into the device. In the case of a separate stereoscopic relay optic attachment, as shown in FIG. 5A, the attachment must be interchangeable with the specific "mounting system" of the lens and camera. It should be understood that the stereoscopic relay of the current invention may be provided with attachment means for use with any available mounting system, including, for example, M42, M39, Canon EF and EF-S lens mounts, Four Thirds system, Micro Four Thirds system, Pentax K mount, Sigma SA mount, Sony α mount system, and various generic bayonet style mounts. Regardless of the specific lens type or mounting standard used, the stereoscopic relay optic described above may be used to pass through the features of the lens, including optical characteristics, focal length, aperture, field of view, auto zoom, focusing, etc. In addition, it should be understood that all electrical and signal connections can be integrated into the relay optics so that all electronic controls can be passed through the relay between the lens and the camera itself.

Figure 6A:
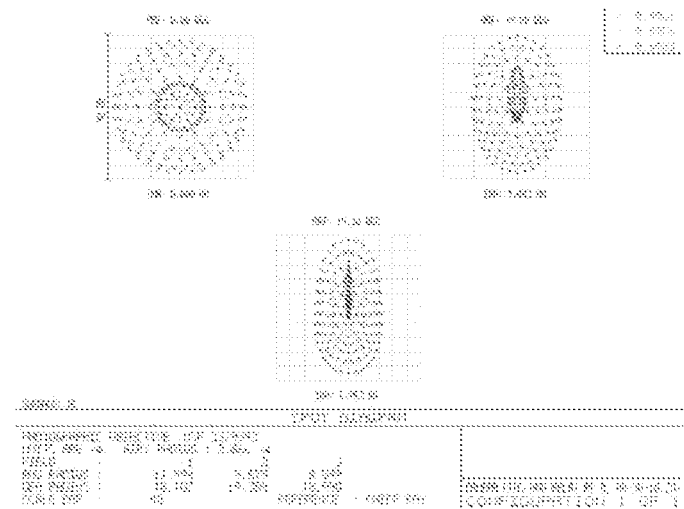
FIGS. 6A to 6D are spot diagrams of an embodiment of a stereoscopic camera relay optic adapter system in accordance with the current invention.
Figure 6B:
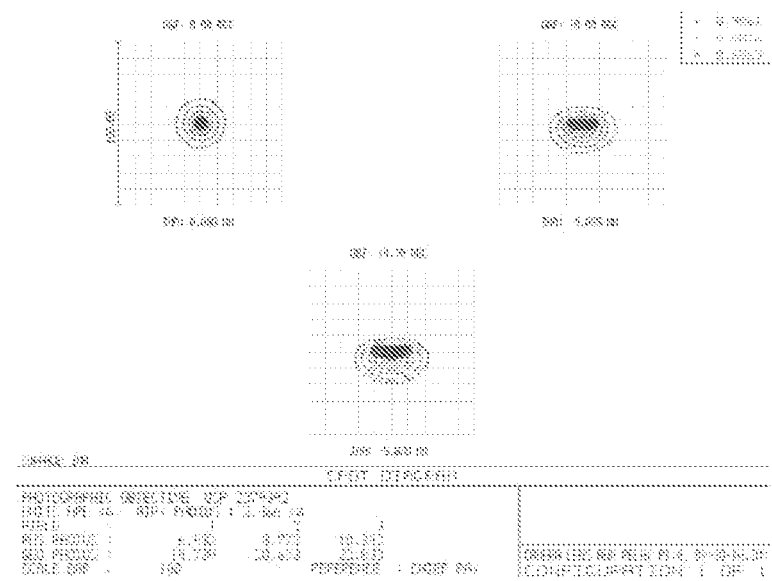
Figure 6C:
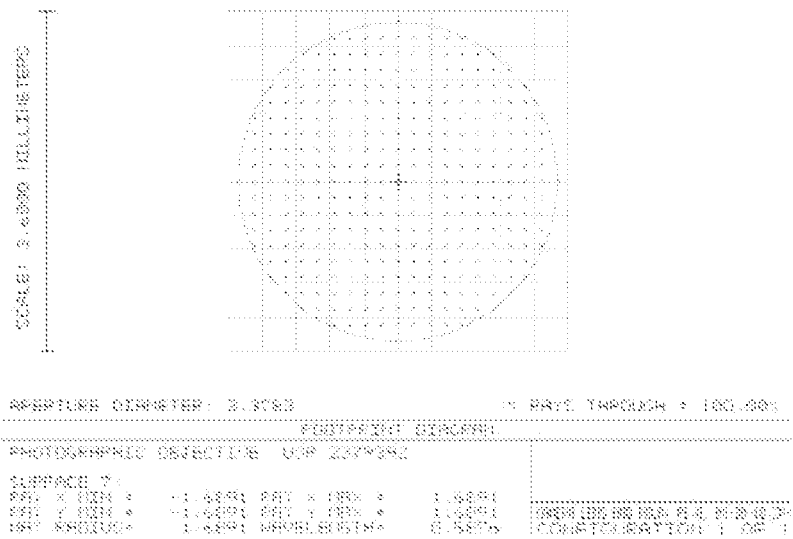
Figure 6D:
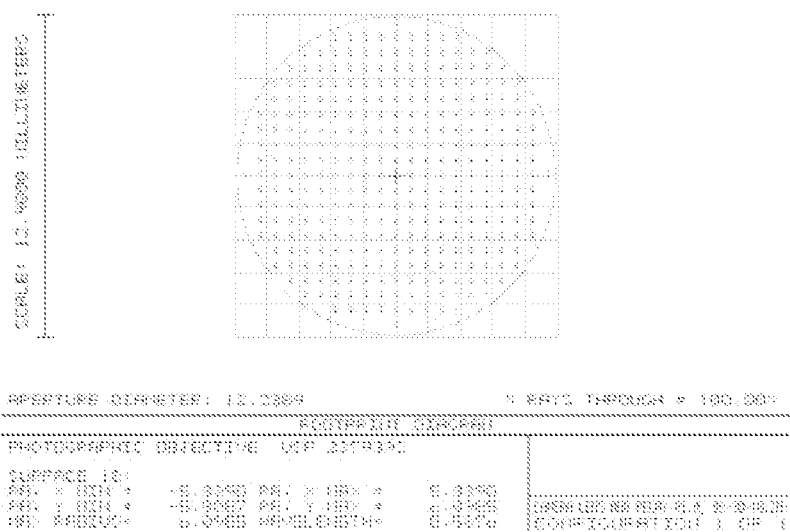

FIGS. 6A to 6D provide spot diagrams showing the operation of the relay optic and its ability to "pass" the image from the camera lens 1 through the stereoscopic shutter 18 with minimal distortion. More particularly, in FIG. 6A, provides spot diagram at the camera focal plane (intermediate image plane) for an optical arrangement as shown in FIG. 4, where the camera lens has the following optical characteristics (f=23 mm, f/4). FIG. 6B now shows a spot diagram at the image plane. It should be noted that the position of the marginal field is −5.87 mm, which compares with +5.87 mm for FIG. 6A. Thus magnification using the exemplary stereoscopic optical relay is nominally 1× (minus sign indicates real inverted image). Similarly, FIG. 6C shows the geometric footprint of the optical fields at the aperture stop. In comparison, FIG. 6D shows the geometric footprint at the relayed pupil. (In this example the pupil magnification=12.24 mm/3.38 mm=3.6×. Perfect imaging would show all colors exactly lining up as is seen in FIG. 6C. The results of these optic simulations demonstrate that, the effective lens characteristics of the basic camera optic may be passed thorough the stereoscopic shutter via the stereoscopic relay optic in accordance with the current invention such that stereoscopic images may be obtained from a conventional camera using the inventive adapter without otherwise impacting the optical characteristics of the camera.

Regardless of the actual type of camera and lens system used with the stereoscopic relay optic adapter of the invention, it should be understood that specific structural constraints need to be taken into consideration. For example, it is necessary for the camera to be in sync with the shutter so that it can toggle between left and right views to produce a stereoscopic effect. In addition, the orientation of the shutter and the camera relative to each other must remain fixed. If the orientation of the camera or shutter relative to each other is changed, the imaging plane of the camera will not "know" whether the image being transmitted to it is from the right or left portion of the shutter, and the stereoscopic effect will be destroyed or degraded. FIG. 7 provides a schematic showing how a change in the relative orientation of the camera and the shutter can affect the stereoscopic image on the screen. In the left-side view the camera 36 and shutter 38 are properly aligned, so that as the shutter switches between left and right views the camera is transmitting those images to the screen 40 in the proper orientation. However, in the right-side view, the shutter has been rotated 90 degrees so that there are "top" and "bottom" views. However, the camera has not been rotated, so the display still displays the top orientation as a left orientation. The result being that the stereoscopic effect is destroyed for the observer. Accordingly, in one embodiment of the invention, the stereoscopic shutter and camera adapters are designed to ensure that the shutter and camera can only be interconnected when they are oriented as appropriate. In many modern cameras the lens can sense its horizontal/vertical orientation, i.e., whether the use is attempting to take a picture in a portrait or landscape mode. It should be understood that the stereoscopic shutter of the instant invention may integrate such feature, such that the orientation of the shutter can be rotated, either manually or automatically, to match the orientation of the camera itself.

It should be understood that a programmable circuit device (not shown), which controls the operation of the stereoscopic shutter is also provided with the optic adapter. This circuit device controls the transition of each of the shutter elements from the transmissive to opaque state as well as the transition of the shutter elements from the opaque to transmissive to state. This circuit device can also be interconnected with the camera and/or the video display device to synchronize the visible video portion of each video frame with the shutter.

The presence of such a controllable electronic device, in combination with the active stereoscopic shutter of the invention allows for a great deal of flexibility in the operation of the stereoscopic optics. For example, using the shutter control circuit device it would be possible for a user to perform a number of unique functions:

- The stereoscopic shutter control technology allows for the shutter to be turned on and off instantaneously. This allows for an instantaneous transition between 3D and 2D views without requiring any changes to the lens, shutter or adapter.
- It is also possible to embed a sync circuit so that the user can control the left and right fields to align them with the appropriate odd and even frames of the camera. This circuit can either allow for manual control of this sync or to automatically sync the L/R views to the particular camera requirements.
- Using the stereoscopic shutter control technology it is also possible to sync the processing/timing of the video with the shutter and the shutter to camera such that it is possible to ensure that all three elements (shutter/camera/video display) are all synched to show the same L/R views and to switch these elements if they become unsynched at any time.
- It is also possible to use the controller to trigger a still camera to take two pictures at a time that would be synched to the right and left, thereby allowing for high quality stereoscopic images to be taken without requiring the mechanical movement of any of the elements of the adapter.
- In another embodiment, an additional video processor circuit could be included in the shutter controller that would allow for the conversion of frame sequential stereoscopic images to a stereoscopic video output in any desired format, including: frame sequential, progressive, interlaced, side by side, checkerboard and horizontal interleave/line by line, etc.
- In still another embodiment, because multielement/multipixel shutter is being used it is possible to selectively arrange the left and right sides (i.e., the position of the center pixel in relationship to the optical axis or image center) to help center the shutter location automatically with a feedback mechanism, or manually center the shutter position without having to mechanically adjust the shutter location.
- In yet another embodiment, the shutter is configured to rotate (either manually or automatically) to maintain alignment with the camera when the camera is provided with an automated orientation feature (e.g., portrait/landscape modes).

Using the stereoscopic shutter controller also allows for image analysis. In one embodiment left and right images of the specimen are examined to determine the proper parallax of the image. Parallax is the is the apparent displacement or difference in the apparent position of an object viewed along two different lines of sight, and is measured by the angle or semi-angle of inclination between those two line, as shown schematically in FIG. 8. As shown in this schematic an observer (M) views object (O) from two different positions (P1 and P2). O is closer to the observer than the background (B), so the change of position from P1 to P2 forces a change of projection of O to the corresponding positions S1 and S2. Because B is much farther away than O, this change of projected positions is larger for O than for B. Accordingly, the observer perceives a visual change of position of O against B. To account for this in the current system, the width of the shutter can be adjusted, as shown in FIG. 9A to 9C, to adjust the parallax of the system and thereby improve image quality. As shown in these schematics as the parallax increases (from FIG. 9A to 9B to 9C) the number of right (42) and left (44) elements activated in the shutter (146) increases. Such a spectroscopic shutter width adjustment could be done manually through a shutter controller, or may alternatively be incorporated into a feedback loop system such that the shutter parallax would be automatically adjusted while zooming or magnifying objects. In such a system, the parallax adjustment can either be made in accordance with certain presets based on the level of magnification or zoom of the single lens optical device, or via range finding device, such as, for example, a short ranging sonar.

Doctrine of Equivalents

This description of the invention has been presented for the purposes of illustration and description. It is not intended to be exhaustive or to limit the invention to the precise form described, and many modifications and variations are possible in light of the teaching above. For example, although the above discussion of the stereoscopic adapter relay optics and circuits is described principally in relation with a still camera, it should also be understood that the adapter can be equally applied to any other single lens optic devices, such as, for example, video cameras. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

What is claimed is:

1. A stereoscopic optic adapter comprising:
    an optical relay comprising a single optical path, the optical relay being interconnectable between an image capture device and an optical lens of said image capture device, the optical relay comprising a stereoscopic shutter and at least one optical element;
    wherein the stereoscopic shutter is configured to produce a stereoscopic image from an original image captured by the optical lens of the image capture device;
    wherein the at least one optical element of the optical relay is configured to transmit the original image along a single optical path from said optical lens through said stereoscopic shutter to said image capture device without altering the lens characteristics of said optical lens, such that a stereoscopic image having the same optical characteristics of the original image is transmitted to the image capture device from the optical relay; and
    wherein a relative rotational alignment around the optical path axis between the stereoscopic shutter and the image capture device is adjustable such that a stereoscopic image may be produced regardless of the orientation of the image capture device.

2. The stereoscopic optic adapter of claim 1, wherein the stereoscopic shutter is configured to alternately occlude the light exiting from predetermined regions of the single lens optical device.

3. The stereoscopic optic adapter of claim 2, wherein the predetermined regions are the left and right regions of the imaged region.

4. The stereoscopic optic adapter of claim 1, wherein the shutter comprises a plurality of separately controllable occludable regions.

5. The stereoscopic optic adapter of claim 4, wherein the occludable regions are formed by a device selected from the group consisting of mechanical, electromechanical, chemical and material.

6. The stereoscopic optic adapter of claim 4, wherein the occludable regions are formed in a shape selected from the group consisting of curve, circular, hexagonal and rectangular.

7. The stereoscopic optic adapter of claim 4, wherein at least one of the occludable regions is fixed.

8. The stereoscopic optic adapter of claim 1, wherein the at least one optical element of the relay optic comprises a pair of paraxial lenses, and wherein the stereoscopic shutter is disposed at the real image of the aperture stop of said paraxial lenses.

9. The stereoscopic optic adapter of claim 1, wherein the optic adapter comprises a separate body removably interconnectable between the optical lens and the image capture device.

10. The stereoscopic optic adapter of claim 9, wherein the interconnection is a mounting system selected from the group consisting of M42, M39, Canon EF and EF-S lens mounts, Four Thirds system, Micro Four Thirds system, Pentax K mount, Sigma SA mount, Sony α mount system, and generic bayonet style mounts.

11. The stereoscopic optic adapter of claim 1, wherein the camera lens is a multi-element camera lens and wherein the optic adapter is disposed within the multi-element camera lens of the image capture device.

12. The stereoscopic optic adapter of claim 1, wherein the optic adapter is disposed within the body of the image capture device.

13. The stereoscopic optic adapter of claim 1, wherein the stereoscopic shutter acts as an iris.

14. The stereoscopic optic adapter of claim 1, wherein the camera lens is a zoom lens and wherein the optic adapter is incorporated within the zoom lens.

15. The stereoscopic optic adapter of claim 14, wherein the zoom lens comprises a series of converging lenses that are configured to be removably placed into optical alignment with the stereoscopic shutter to adjust the focal length of the adapter.

16. The stereoscopic optic adapter of claim 1, wherein the lens characteristics transmitted through the optic adapter include at least one selected from the group consisting of focal length, aperture, field of view, auto zoom and focusing.

17. The stereoscopic optic adapter of claim 1, wherein the optical lens and the image capture device further comprise at least one cooperative electrical interconnect; and
    the adapter further comprises at least one electrical connection cooperative with the at least one electrical interconnection on the optical lens and the image capture device such that a signal path is established between the optical lens and the image capture device through the adapter.

18. The stereoscopic optic adapter of claim 1, wherein the image capture device is selected from the group consisting of mechanical still cameras, digital still cameras, CCDs, CMOSs, digital video camera, and light field capture systems.

19. The stereoscopic optic adapter of claim 1, wherein at least one of the adapter and image capture device are mounted on adjustment stages configured to allow the rotational alignment of the adapter in relation to the image capture device.

20. The stereoscopic optic adapter of claim 1, further comprising a programmable controller circuit to control the operation of the stereoscopic shutter.

21. The stereoscopic optic adapter of claim 20, wherein the shutter comprises a plurality of separately controllable occludable regions configured to alternately occlude the light exiting from predetermined regions of the single lens optical device, and wherein the programmable controller circuit controls the operation of each of the occludable regions.

22. The stereoscopic optic adapter of claim 20, wherein the programmable controller circuit is in further signal communication with the image capture device, and is configured to synchronize the image capture device with the opening and closing of the stereoscopic shutter to ensure stereoscopic viewing.

23. The stereoscopic optic adapter of claim 20, wherein the programmable controller circuit is configured to disable the stereoscopic shutter such that the adapter can be reconfigured into a non-stereoscopic device.

24. The stereoscopic optic adapter of claim 20, wherein the programmable controller circuit is configured to examine parallax of the stereoscopic image, and to optimize the operation of the stereoscopic shutter for optimum stereoscopic imaging.

25. The stereoscopic optic adapter of claim 20, wherein the image capture device has a rolling shutter, and wherein the programmable controller circuit is configured to synchronize the stereoscopic shutter with said rolling shutter.

26. The stereoscopic optic adapter of claim 20, wherein the image capture device comprises a still camera, and wherein the programmable controller circuit is configured to synchronize the still camera with the stereoscopic lens to capture a single still stereoscopic image.

27. The stereoscopic optic adapter of claim 20, wherein the programmable controller circuit is configured to allow for the conversion of data from the image capture device to a stereoscopic video output in a format selected from the group consisting of anaglyph, two-dimensional, frame sequential, progressive, interlaced, side by side, checkerboard and horizontal interleave/line by line.

28. The stereoscopic optic adapter of claim 20, wherein the programmable controller circuit is configured to center the stereoscopic shutter position with the optical axis of the single lens optic device.

29. The stereoscopic optic adapter of claim 1, wherein the stereoscopic shutter is electronic and the stereoscopic effect is generated via image signal processing.

30. A stereoscopic optic adapter comprising:
an optical relay interconnectable between an image capture device and an optical lens of said image capture device, the optical relay comprising a stereoscopic shutter and at least one optical element;
wherein the stereoscopic shutter is configured to produce a stereoscopic image from an original image captured by the optical lens of the image capture device;
wherein the at least one optical element of the optical relay is configured to transmit the original image from said optical lens through said stereoscopic shutter to said image capture device without altering the lens characteristics of said optical lens, such that a stereoscopic image having the same optical characteristics of the original image is transmitted to the image capture device from the optical relay; and
wherein a relative rotational alignment around the optical path axis between the stereoscopic shutter and the image capture device is adjustable such that a stereoscopic image may be produced regardless of the orientation of the image capture device; and
wherein both the adapter and image capture device are mounted on rotational adjustment stages configured to allow the rotational alignment of the stereoscopic shutter in relation to the image capture device, and wherein the adjustment stages are interconnected such that rotation of one of either the stereoscopic shutter or the image capture device causes an equivalent rotation in its counterpart.

31. The stereoscopic adapter of claim 30, wherein the image capture device automatically rotates its perspective based on the orientation of the image capture device with respect to the horizon.

32. The stereoscopic adapter of claim 31, wherein the adapter is configured to automatically rotate based on the orientation of the image capture device.

* * * * *